United States Patent
Kang

(10) Patent No.: US 7,373,453 B2
(45) Date of Patent: May 13, 2008

(54) METHOD AND APPARATUS OF INTERLEAVING MEMORY BANK IN MULTI-LAYER BUS SYSTEM

(75) Inventor: Woo-seok Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 227 days.

(21) Appl. No.: 11/052,773

(22) Filed: Feb. 9, 2005

(65) Prior Publication Data

US 2005/0182908 A1    Aug. 18, 2005

(30) Foreign Application Priority Data

Feb. 13, 2004  (KR) .................... 10-2004-0009755

(51) Int. Cl.
*G06F 12/00* (2006.01)
(52) U.S. Cl. .................... 711/105; 711/5; 711/157; 710/110
(58) Field of Classification Search ............... 711/131, 711/149
See application file for complete search history.

(56) References Cited

U.S. PATENT DOCUMENTS

| | | | |
|---|---|---|---|
| 5,386,537 A | 1/1995 | Asano | |
| 6,418,077 B1 * | 7/2002 | Naven | 365/233 |
| 6,564,284 B2 | 5/2003 | Christenson | |
| 6,892,289 B2 * | 5/2005 | Moss | 711/167 |
| 6,948,098 B2 * | 9/2005 | Pillay et al. | 714/34 |
| 6,985,985 B2 * | 1/2006 | Moss | 710/240 |
| 7,013,356 B2 * | 3/2006 | Moss | 710/200 |
| 2004/0006665 A1 * | 1/2004 | Moss | 711/5 |
| 2004/0064599 A1 * | 4/2004 | Jahnke et al. | 710/14 |
| 2004/0123036 A1 * | 6/2004 | Hammitt et al. | 711/131 |
| 2004/0123038 A1 * | 6/2004 | Shami et al. | 711/132 |
| 2004/0215893 A1 * | 10/2004 | Emerson et al. | 711/138 |

FOREIGN PATENT DOCUMENTS

| | | |
|---|---|---|
| JP | 2003-131943 | 5/2003 |
| KR | 20010105938 | 11/2001 |
| KR | 20010105938 A * | 11/2001 |
| KR | 1020030045535 | 6/2003 |
| KR | 1020030045535 A * | 6/2003 |

OTHER PUBLICATIONS

Andrew S. Tanenbaum, "Structured Computer Organization, Second Edition", Prentice-Hall, Inc., 1984, pp. 10-12.*
AMBA Specification, Rev 2.0, ARM, May 13, 1999, pp. 3-1 to 3-57.*

* cited by examiner

*Primary Examiner*—Jasmine Song
(74) *Attorney, Agent, or Firm*—Staas & Halsey LLP

(57) ABSTRACT

A method and apparatus of interleaving memory banks in a multi-layer bus system. The apparatus includes a plurality of slave interface units receiving signals requesting a bus access and generating control signals, and a controller receiving the control signals generated from the plurality of slave interface units and generating signals required to access the memory banks. Accordingly, it is possible to greatly reduce a delay time caused when accessing a synchronous dynamic random access memory (SDRAM), for example, in a multi-layer bus system.

27 Claims, 10 Drawing Sheets

FIG. 1C (PRIOR ART)

(RAS1) (NOP) (CAS1) (NOP*(N-1)) (BS1) (CAS2) . . .

FIG. 1D (PRIOR ART)

(RAS1) (NOP) (CAS1) (RAS2) (NOP*(N-2)) (BS1) (CAS2) . . .

METHOD AND APPARATUS OF INTERLEAVING MEMORY BANK IN MULTI-LAYER BUS SYSTEM

CROSS-REFERENCE TO RELATED APPLICATION

This application claims the benefit of Korean Patent Application No. 2004-9755, filed on Feb. 13, 2004 in the Korean Intellectual Property Office, the disclosure of which is incorporated herein in its entirety by reference.

BACKGROUND OF THE INVENTION

1. Field of the Invention

The present invention relates to interleaving of a memory bank, and more particularly, to a method and apparatus of interleaving a memory bank in a multi-layer bus system.

2. Description of the Related Art

A structure of a bus in an embedded System-on-Chip (SoC) depends on the type of a processor installed in the SoC. For instance, an Advanced Microcontroller Bus Architecture (AMBA) Advanced High-performance Bus (AHB) is used when an ARM processor is included in a SoC. In general, the performance of the SoC varies according to factors, such as the type of a processor, the performance of software and the performance of a bus provided. When a piece of hardware is manufactured using the SoC, connection with a memory or memories is required. The hardware performance is largely affected by that of the memory. Generally, a Synchronous Dynamic Random Access Memory (SDRAM) or a Double Data Rate (DDR) memory is used as the memory. Accordingly, a delay in data transmission may occur based on the performance of the memory.

When a slave device, such as an SDRAM, is shared and simultaneously accessed by a plurality of master devices, such as a processor or a Direct Memory Access (DMA) unit, the performance of a system is not remarkably influenced by the type of bus used. In this case, the performance of the system is affected only by a response delay of the bus. Generally, the AHB bus, for example, is a bus with good performance, which has a clock response delay of 0.

Moreover, when the SDRAM is used as a slave device and reading and/or writing data is performed by accessing the SDRAM, it is possible to reduce a response delay caused when the SDRAM is continuously accessed by using bank interleaving. Bank interleaving is a function of improving speed of data processing by dividing a storage space of a memory into several banks, for example, dividing the storage space of the memory into rooms for storing and/or processing data, and allowing the several banks to process data in response to a processing command.

However, it is impossible to use bank interleaving for an SDRAM connected with an AHB system bus, where sequence of commands and responses to commands are predetermined and, thus, a large delay in data transmission becomes unavoidable.

SUMMARY OF THE INVENTION

An aspect of the present invention provides a method and apparatus of interleaving memory banks of a Synchronous Dynamic Random Access Memory (SDRAM) using bank interleaving, where the SDRAM is shared and accessed by a plurality of master and/or slave devices, thereby minimizing a delay when the SDRAM is accessed.

According to an aspect of the present invention, a method of interleaving memory banks of a memory connected with a multi-layer bus system is provided. The method includes: receiving signals requesting access to a bus, generating control signals, and receiving a plurality of sets of the control signals and generating signals required to access the memory banks.

When receiving the plurality of sets of the control signals and generating the signals required to access the memory bank, a signal requesting access to a memory bank, which is not accessed by the plurality of master devices and/or the plurality of slave devices may be processed for a first time.

Additional aspects and/or advantages of the invention will be set forth in part in the description which follows and, in part, will be obvious from the description, or may be learned by practice of the invention.

According to another aspect of the present invention, an apparatus to interleave memory banks of a memory connected with a multi-layer bus system is provided. The apparatus includes: a plurality of slave interface units receiving signals requesting access to a bus and generating control signals, and a controller receiving the generated control signals from the plurality of slave interface units and generating signals required to access the memory banks.

According to an aspect of the present invention, a plurality of layers of the multi-layer bus system are connected with a plurality of master devices and/or a plurality of slave devices, and different banks are respectively allocated to the plurality of layers.

According to an aspect of the present invention, the apparatus includes an arbiter receiving the signals requesting the bus access from the plurality of master devices and/or the plurality of slave devices, and arbitrating the signals so that a right for the bus access is given to one of the plurality of master devices and/or the plurality of slave devices.

According to an aspect of the present invention, the controller processes a signal requesting access to a memory bank, which is not accessed by the plurality of master devices and/or the plurality of slave devices, for the first time, where the signal is input from a slave interface unit.

According to an aspect of the present invention, a storage space of the memory is divided into a plurality of banks and the plurality of banks are allocated to the slave interface units.

BRIEF DESCRIPTION OF THE DRAWINGS

The above and/or other aspects and advantages of the present invention will become apparent and more readily appreciated from the following description of the embodiments taken in conjunction with the accompanying drawings of which:

FIG. 1C illustrates an order in which SDRAM control signals are generally generated when data is transmitted as a second burst at a row of a bank where data is transmitted as a first burst;

FIG. 1D illustrates an order in which SDRAM control signals are generally generated during bank interleaving;

DETAILED DESCRIPTION OF THE PREFERRED EMBODIMENTS

Figure 1A:
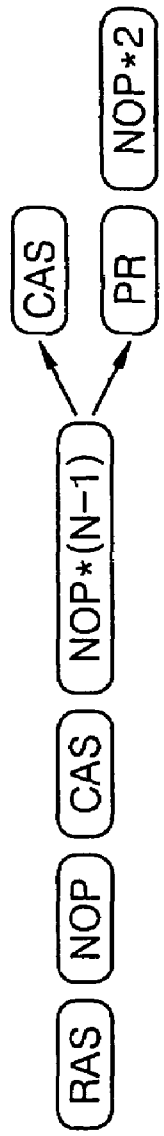
FIG. 1A illustrates an order in which signals to control a Synchronous Dynamic Random Access Memory (SDRAM) are generally generated when N pieces of data are transmitted in a burst mode.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1A illustrates an order in which SDRAM control signals are generated when N pieces of data are transmitted as a burst. In an SDRAM, a position of a storage space is determined with the use of rows and columns, and thus, the row and column of a particular address of the SDRAM are selected to write data to and/or read data from the particular address.

Referring to FIG. 1A, when an address of the SDRAM for data access is determined, a Row Address Strobe (RAS) signal to enable selection of a row of the address is generated from a first clock, a No OPeration (NOP) signal allowing no operation is generated from a second clock, and a Column Address Strobe (CAS) signal to enable selection of the column of the address is generated from a third clock. A signal that indicates a bank for the row of the address is output together with the output of the RAS signal. Further, no signal is generated during an N-1 clock, where N indicates a number of pieces of data that must be transmitted. Further, a Burst Stop (BS) signal or a Precharge (PR) signal is generated. After the PR signal is generated, other control signals are generated during a period of 2 clocks. A new RAS signal is not required after generation of the BS signal, but a new RAS signal must be generated after generation of the PR signal since an address with a previous row is closed. That is, the BS signal is generated when a new RAS signal is required, otherwise, the PR signal is generated.

Figure 1B:
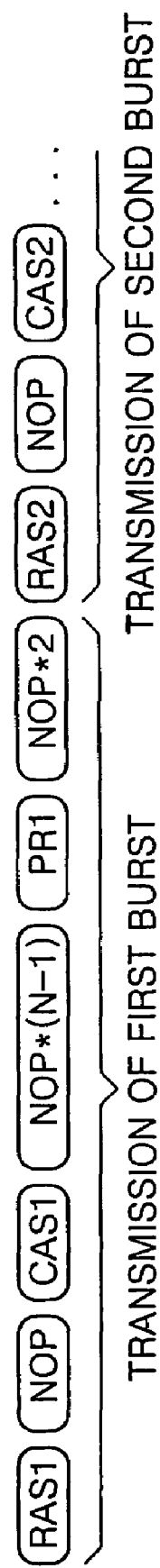
FIG. 1B illustrates an order in which SDRAM control signals are generally generated when data is continuously transmitted as bursts.

FIG. 1B illustrates an order in which SDRAM control signals are generated when data is continuously transmitted as bursts. Referring to FIG. 1B, when data is continuously generated as bursts at different rows of the same bank and/or the content of data transmitted as a second burst is unknown beforehand, a first RAS signal, an NOP signal, a first CAS signal, the NOP signal, a first PR signal, and the NOP signal are transmitted as a first burst, and a second RAS signal, the NOP signal, a second CAS signal, the NOP signal, a second PR signal, and the NOP signal are transmitted as the second burst. Accordingly, a relatively significant amount of time is required to continuously transmit signals as first and second bursts.

FIG. 1C illustrates an order in which SDRAM control signals are generated when data is transmitted as a second burst at a row of a bank where data is transmitted as a first burst. When data is transmitted as the second burst at the row of the bank where data is transmitted as the first burst, a first BS signal rather than a first PR signal is generated and a second CAS signal rather than an NOP signal is generated in comparison to the first burst.

FIG. 1D illustrates an order in which SDRAM control signals are generated during bank interleaving. Referring to FIG. 1D, data is transmitted as a second burst at a different bank than a bank where data is transmitted as a first burst. Thus, a second RAS signal and a second CAS signal can be generated in place of an NOP signal as the first burst, thereby reducing a number of clocks required during generation of the NOP signal NOP, and reducing a time required to access an SDRAM.

Figure 2A:
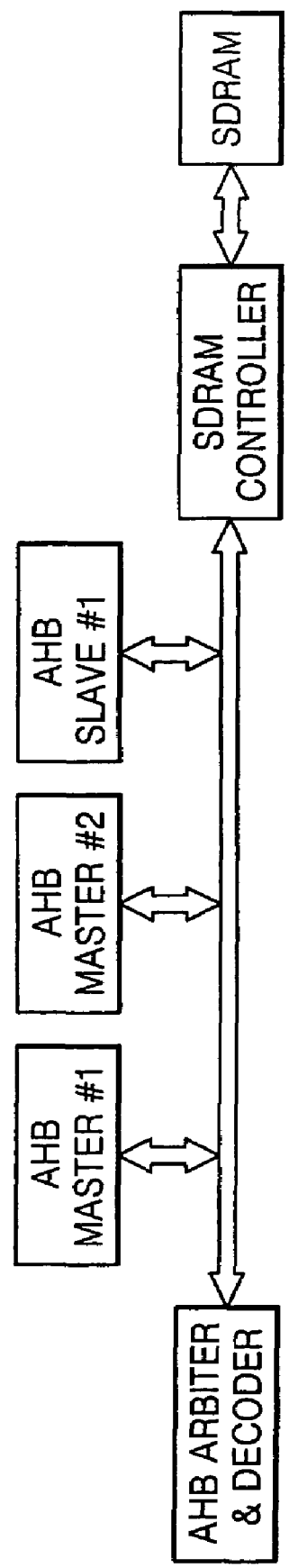
FIG. 2A illustrates a single-layer bus system to which a plurality of master and/or slave devices are connected to access an SDRAM.

FIG. 2A illustrates a single-layer bus system with which a plurality of master and/or slave devices are connected to access an SDRAM. Referring to FIG. 2A, to access an SDRAM, several master devices transmit signals requesting use of a bus of the SDRAM to an AMBA AHB Version 2.0 arbiter and decoder. Then, the AHB arbiter and decoder receives the signals and arbitrates use of the bus. Specifically, the AHB arbiter and decoder gives a master device a right to access the bus according to a predetermined order of priority, detects a slave device using an address of the slave device that the master device having the right desires to access, and selects the slave device.

The single-layer bus system has a simple structure and can arbitrate use of a bus with reduced power consumption, but it does not allow the remaining master devices to access an SDRAM while the SDRAM is accessed by another master device.

Figure 2B:
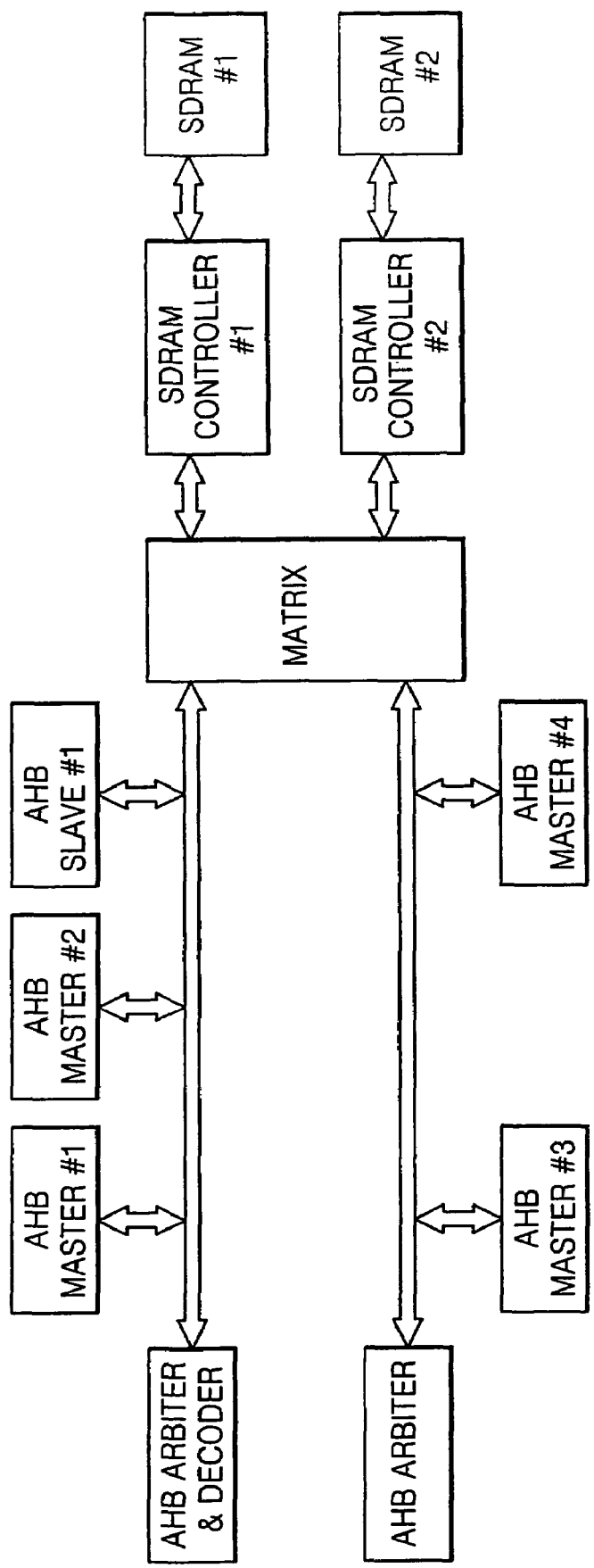
FIG. 2B illustrates a double-layer bus system to which a plurality of master and/or slave devices are connected to access two SDRAMs.

FIG. 2B illustrates a double-layer bus system with which a plurality of master devices and/or slave devices are connected to access two SDRAMs #1 and #2. Here, the layer of the double-layer bus system is used as a term to represent a number of buses, and several devices may be connected with a layer. A matrix receives a command that instructs access to an SDRAM from the respective layers, and switches between SDRAMs #1 and #2. The double-layer bus system provides improved performance because of use of the two SDRAMs #1 and #2 and data can be simultaneously transmitted to both the SDRAMs #1 and #2. However, such a system is expensive to manufacture and requires large power consumption.

Figure 3:
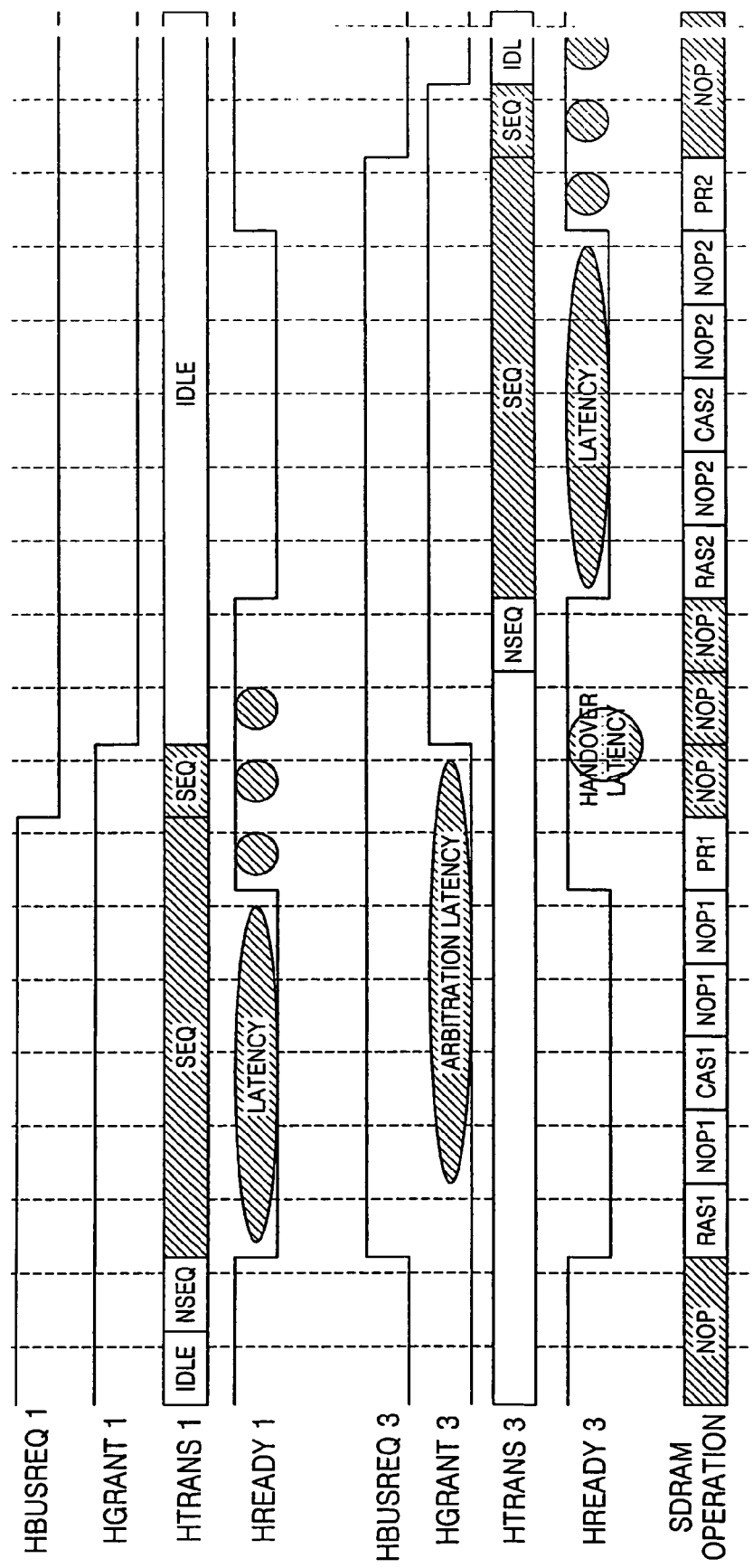
FIG. 3 illustrates timing diagrams of signals according to an AHB protocol when two bursts are continuously transmitted.

FIG. 3 illustrates timing diagrams of signals in accordance with an AHB protocol when two bursts are continuously transmitted. Since simultaneous access of a plurality of master devices to an SDRAM is not permitted, a signal HGRANT #1 output from a first master device (not shown) and a signal HGRANT #3 output from a third master device (not shown) cannot be activated at the same time. Thus, only subsequent to transmission of one burst in response to signals HBUSREQ #1, HGRANT #1, HTRANS #1, and HREADY #1, another burst can be transmitted in response to signals HBUSREQ #3, HGRANT#3, HTRANS #3, and HREADY#3. Therefore, a large delay in transmission of the two bursts is unavoidable.

Figure 4:
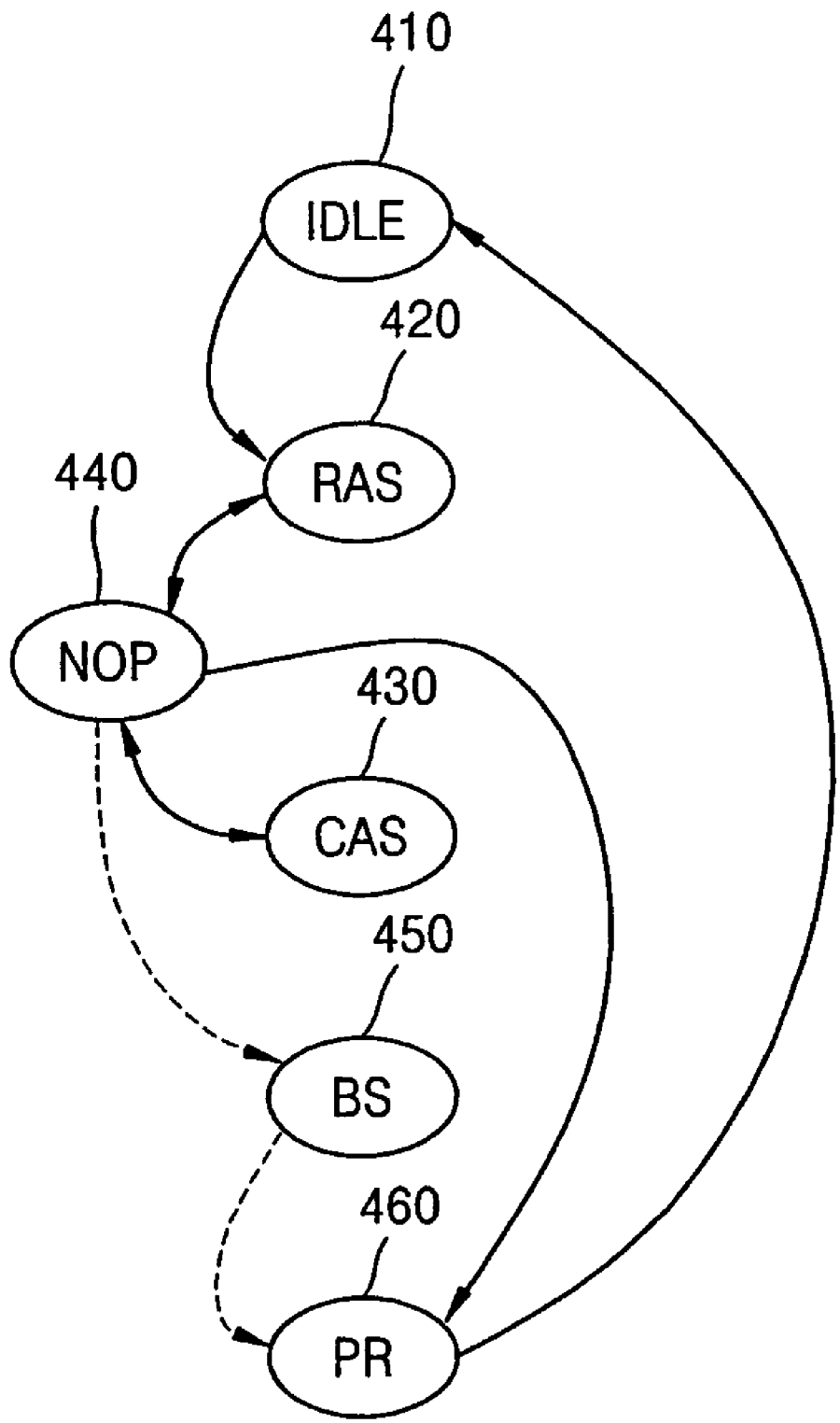
FIG. 4 is a state diagram of signals in a Finite State Machine (FSM) to show possible states of an SDRAM.

FIG. 4 illustrates state diagrams of signals in a Finite State Machine (FSM) to indicate possible states of an SDRAM. Referring to FIG. 4, a state of the SDRAM may be changed from an IDLE state 410 to a RAS state 420 and then, to a NOP state 440. After the NOP state 440, the SDRAM may enter a GAS state 430, a BS state 450, or a PR state 460. After the BS state 450, the SDRAM must enter a PR state 460. Each piece of data is transmitted in each of the above states of the SDRAM, and transmission of each data requires a new RAS signal.

The SDRAM controller 550 controls an SDRAM 560 that includes first and second banks 562 and 564. The first bank 562 is mainly accessed by the first and second master devices 502 and 504, respectively, and the slave device 506 that are connected with the first layer. The second bank 564 is mainly accessed by the third and fourth master devices 508 and 510 that are connected with the second layer.

Figure 6:
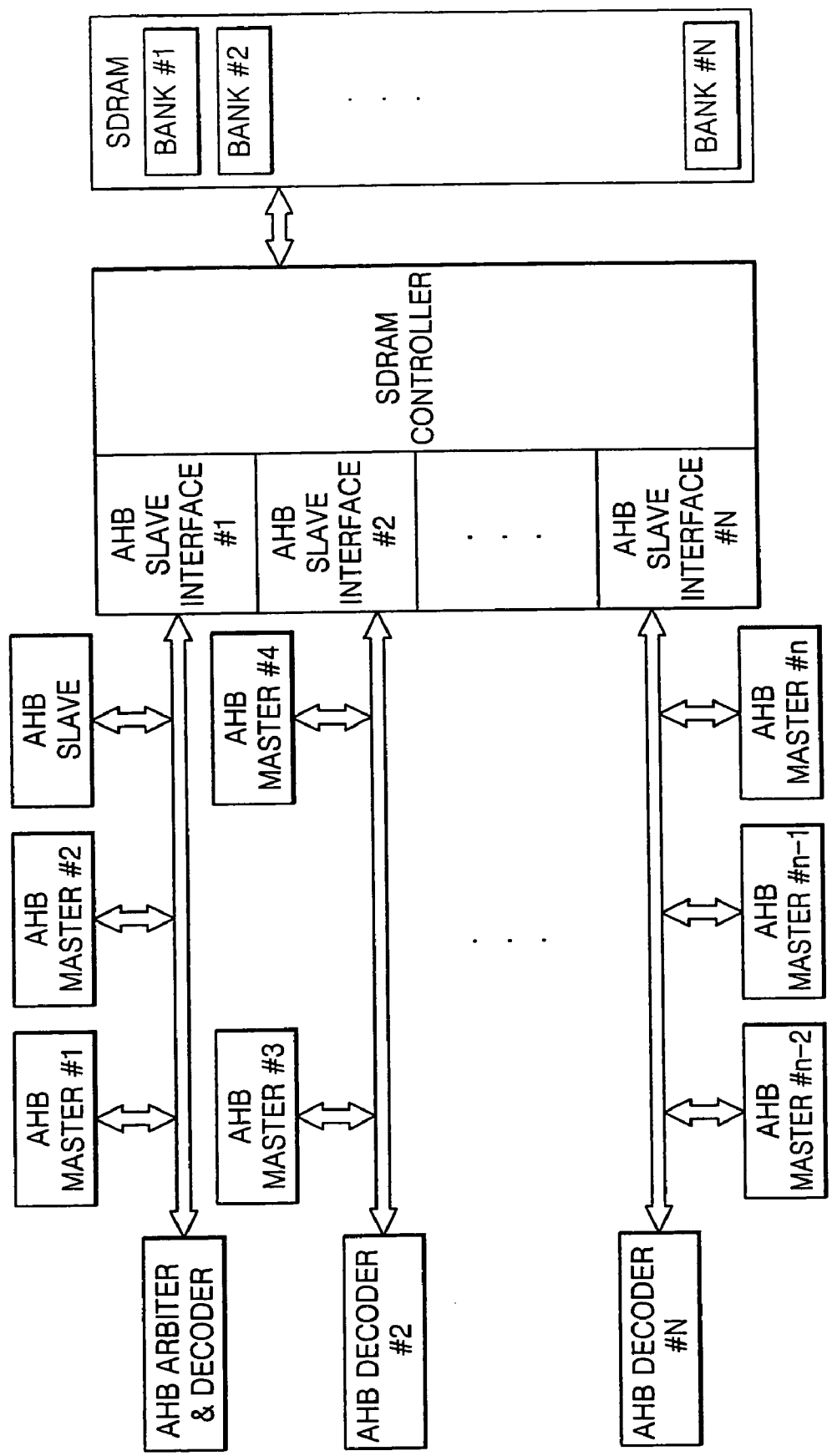
FIG. 6 is a block diagram an N-layer bus system according to an aspect of the present invention.

FIG. 6 is a block diagram to illustrate an N-layer bus system according to an aspect of the present invention. Similar to a dual-layer bus system, a plurality of devices are connected with layers of the N-layer bus system, and N slave interface units are included in the N-layer bus system to provide slave interface for the respective layers. Further, an SDRAM includes N banks.

Figure 5:
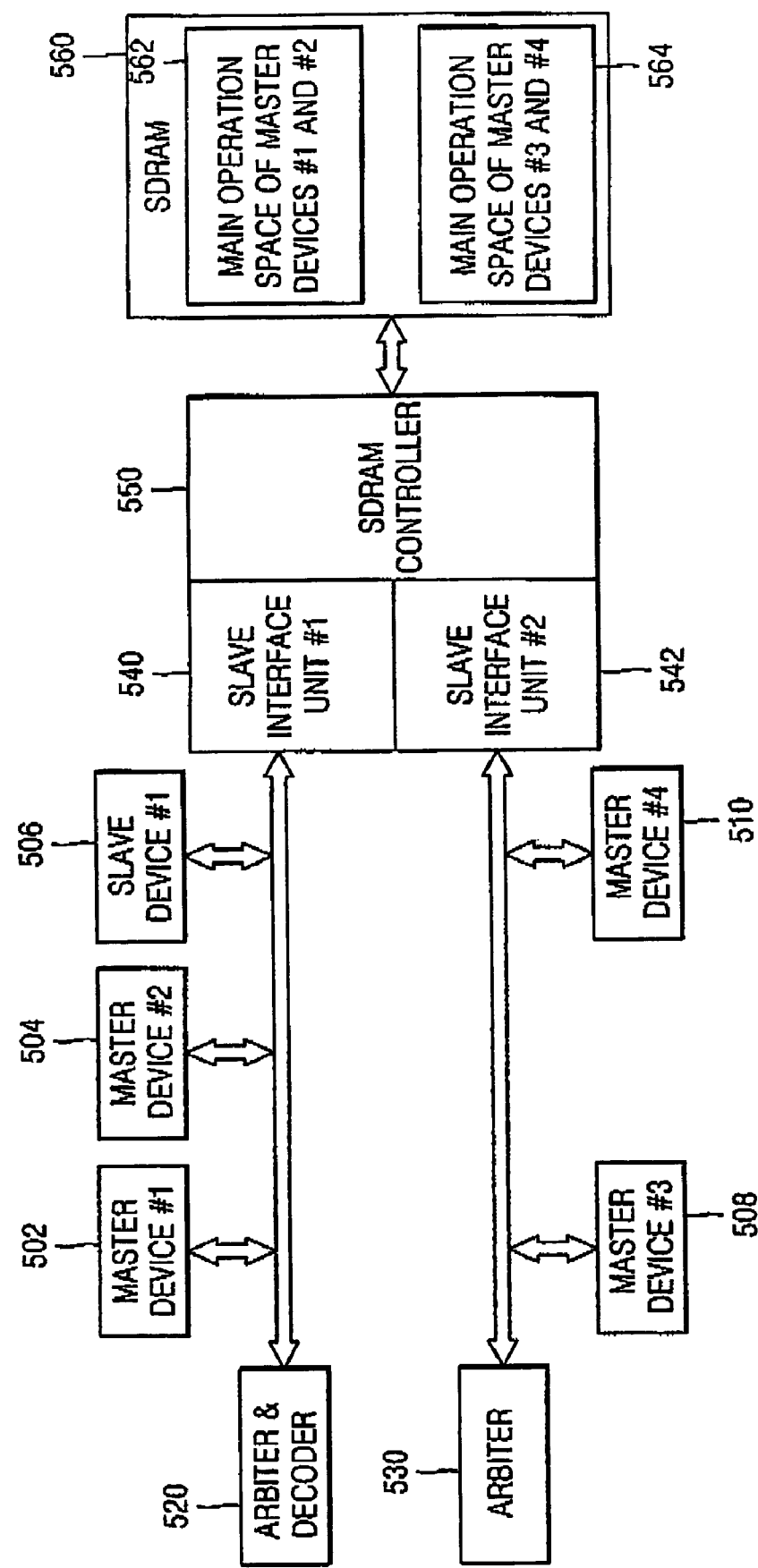
FIG. 5 is a block diagram of a bus according to an aspect of the present invention.
Figure 7:
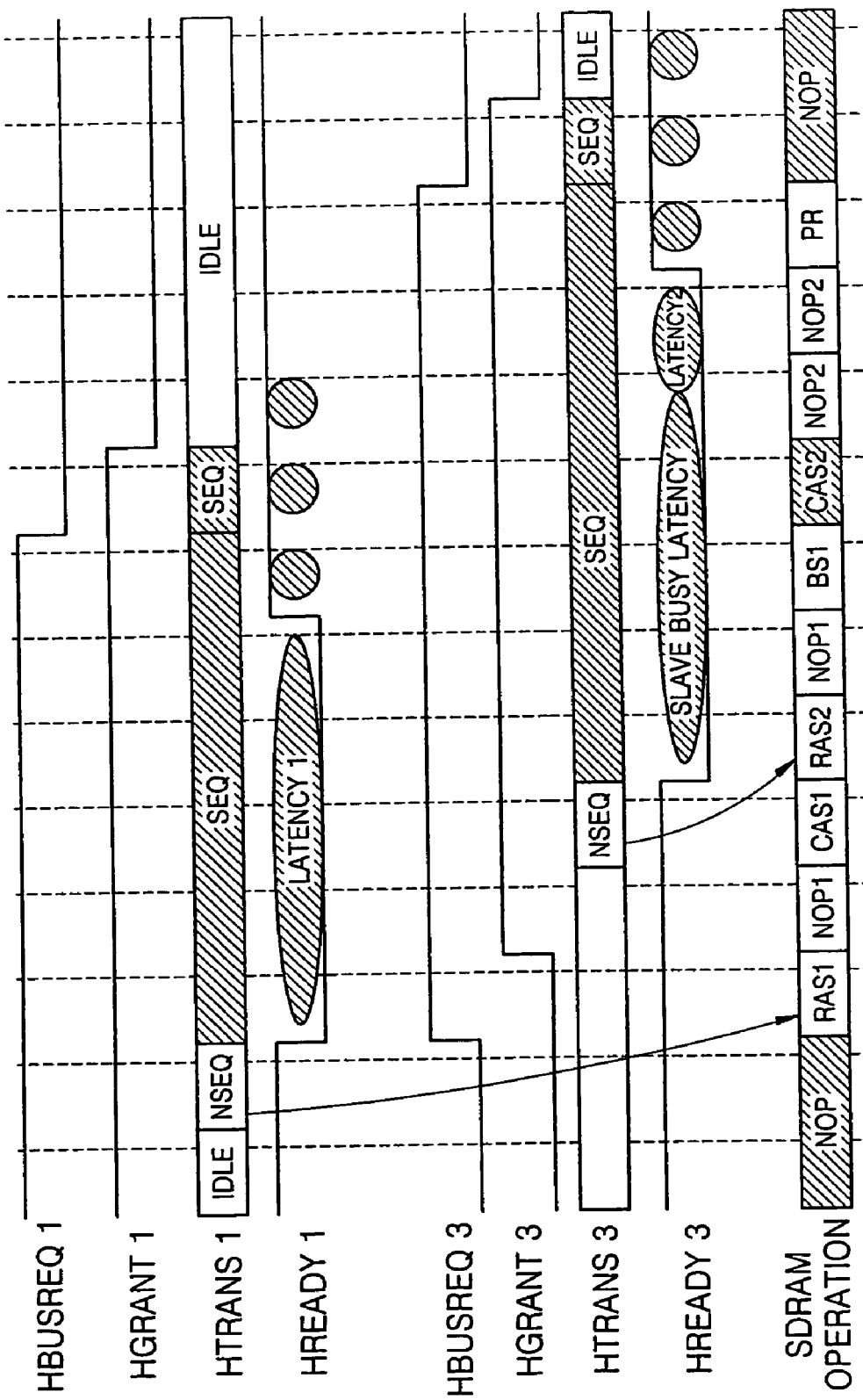
FIG. 7 is a timing diagram of signals for bus access in the bus system of FIG. 5 when two bursts are continuously transmitted, according to an aspect of the present invention.

FIG. 7 illustrates timing diagrams of signals for bus access in the bus system of FIG. 5 when two bursts are continuously transmitted, according to an aspect of the present invention. Since simultaneous access of a plurality of master devices to the SDRAM 560 is not permitted, a signal HGRANT #1 output from the first master device 502 and a signal HGRANT #3 from the third master device 508 can be simultaneously activated. Referring to FIG. 7, in this bus system, access to the SDRAM 560 is efficiently performed since a second RAS signal is generated even before transmission of a burst is completed, thus reducing a number of clocks for generation of a NOP signal. In other words, a command from the first master device 502 is sent to the first slave interface unit 540 and arbitrated by the arbiter & decoder 520. In this case, the SDRAM controller 550 begins transmission of data to the SDRAM 560 in response to a RAS signal output from the SDRAM 560. Thereafter, a time delay corresponding to five clocks is caused until a response signal HREADY1 is generated after an output of a CAS signal from the SDRAM 560. When the third master device 508 connected with the second layer generates a command requesting access to the SORAM 560 during transmission of data to the first master device 502 connected with the first layer, the command is sent to the second slave interface unit 542 by the arbiter 530 connected with the second layer so that transmission of data is executed during a delay in responding to the command, thereby remarkably reducing the response delay.

Figure 8:
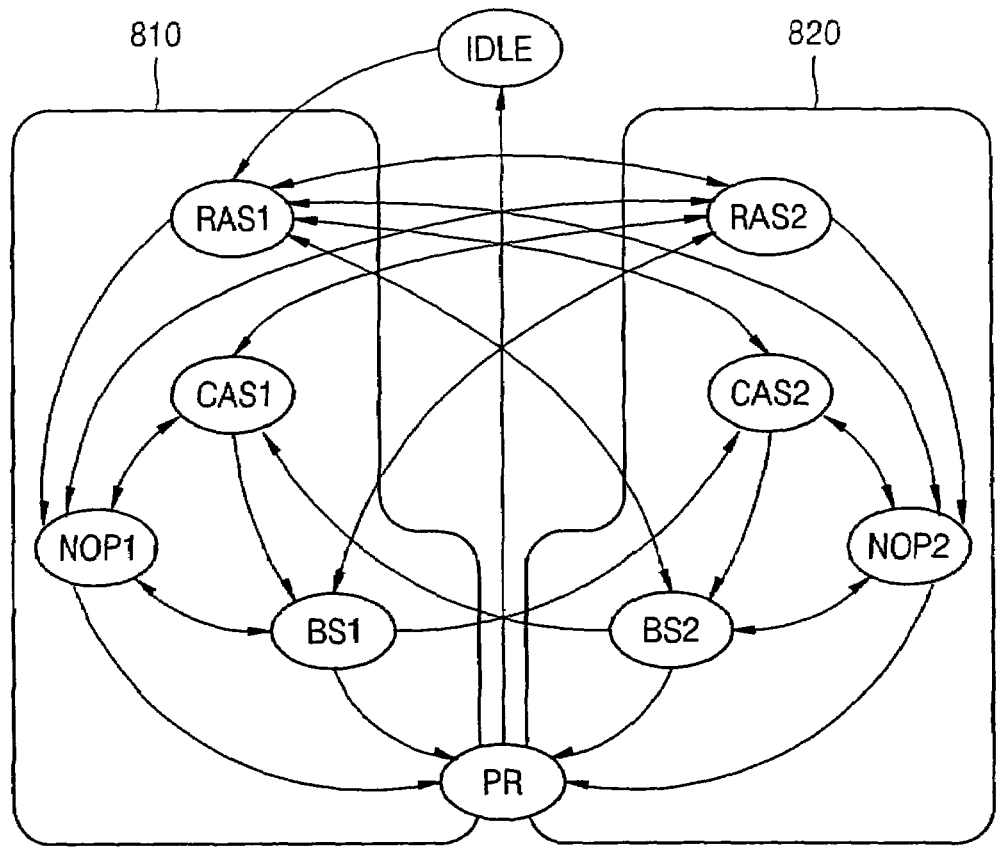
FIG. 8 is a state diagram of signals in a Finite State Machine (FSM) to show possible states of an SDRAM according to an aspect of the present invention.

FIG. 8 illustrates state diagrams of signals in a Finite State Machine (FSM) to show states of an SDRAM according to an aspect of the present invention. In FIG. 8, 810 shows a state diagram of a first layer, and 820 shows a state diagram of a second layer. As shown in FIG. 8, an IDLE state and a PR signal state of an SDRAM are shared by the first and second layers. As the states of the SDRAM change as shown in FIG. 8, a plurality of master devices and/or a plurality of slave devices access the SDRAM.

Figure 9:
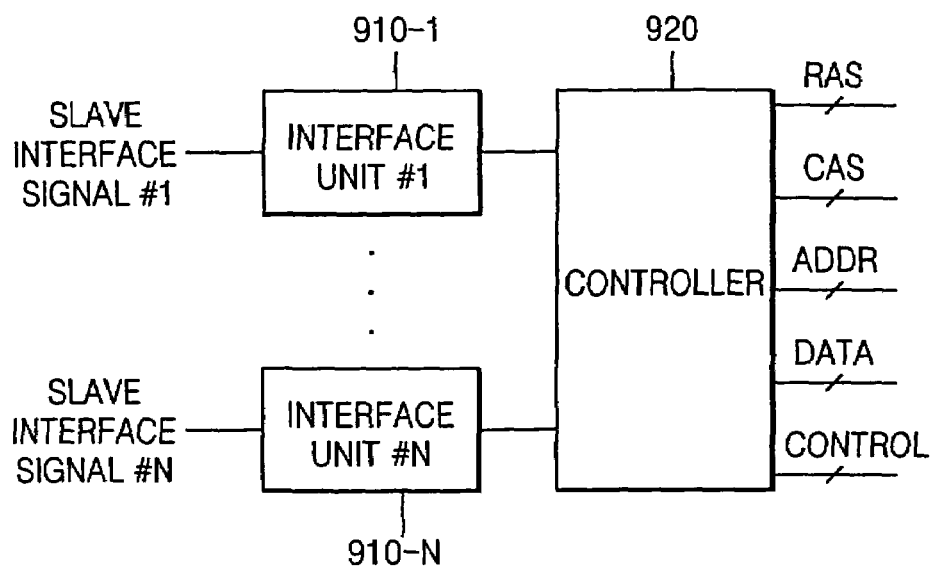
FIG. 9 is a detailed block diagram of an SDRAM controller according to an aspect of the present invention.

FIG. 9 is a detailed block diagram of an SDRAM controller according to an aspect of the present invention. Referring to FIG. 9, N interface units 910-1, . . . , to 910-N that process a plurality of slave interface signals, respectively, are connected with a controller 920 that switches and controls these interface signals. The controller 920 receives a plurality of control signals (not shown) and generates a plurality of control signals, such as signals RAS, CAS, ADDR, and DATA, that allow a plurality of master devices and/or a plurality of slave devices to be connected with an SDRAM.

A method of interleaving a memory bank according an aspect of the present invention has been described with respect to an SDRAM, but the present invention is applicable to various types of memories with a multi-layer bus system. For instance, the present invention may be applied to a Double Data Rate (DDR) memory.

An aspect of the present invention is implemented as a computer program. In this case, the members of the present invention are code segments that execute necessary operations and they can be easily derived by computer programmers in the art to which the present invention belongs. Further, the program may be stored in a computer readable medium, read and implemented in a computer to realize the method of interleaving a memory bank. The computer readable medium may be any medium, such as a magnetic recording medium, an optical recording medium, and a carrier wave.

As described above, according to an aspect of the present invention, since the next data is read before transmission of data is completed, it is possible to interleave memory banks of an SDRAM in a multi-layer bus system, and further, largely reduce a time delay caused when accessing the SDRAM.

While this invention has been particularly shown and described with reference to exemplary embodiments thereof, it will be understood by those skilled in the art that various changes in form and details may be made therein without departing from the principles and spirit of the invention, the scope of which is defined in the claims and their equivalents.

What is claimed is:

1. A method of interleaving memory banks of a memory element connected with a multi-layer bus system, comprising:
   receiving signals from master and/or slave devices requesting access to a bus of one of a plurality of layers and generating respective control signals; and
   receiving the control signals in a plurality of sets and generating corresponding signals required to access specific memory banks of the memory element, the specific memory banks accessed based on the generated corresponding signals,
   wherein signals to access the memory banks corresponding to the plurality of master and/or slave devices connected with a second layer are received during a time delay between the signals to access the memory banks corresponding to the plurality of master and/or slave devices connected with a first layer and transmission of data to the plurality of master and/or slave devices connected with the first layer, and wherein a first memory bank of the memory element is specifically accessed by the master and/or slave devices connected with the first layer and a second memory bank of the memory element is specifically accessed by the master and/or slave devices connected with the second layer.

2. The method according to claim 1, wherein the multi-layer bus system includes the plurality of layers and the plurality of layers of the multi-layer bus system are connected with a plurality of master and/or slave devices, and different banks of the memory element are allocated to the plurality of layers.

3. The method according to claim 1, further comprising:
receiving the signals from master and/or slave devices requesting the bus access from a plurality of master and/or slave devices and arbitrating the signals so that a right for the bus access is given to one of the plurality of master and/or slave devices.

4. The method according to claim 1, wherein when receiving the plurality of sets of the control signals and generating the corresponding signals required to access one of the memory banks of the specific memory banks, a signal used to access a memory bank, which has not yet been accessed by a plurality of master and/or slave devices, is processed for a first time.

5. The method according to claim 1, wherein a storage space of the memory element is divided into a plurality of banks, and the plurality of banks are allocated to buses of the plurality of layers.

6. The method according to claim 1, wherein the memory element is a synchronous dynamic random access memory (SDRAM).

7. The method according to claim 6, wherein an idle state and a precharge state of the memory element connected with the bus system configured with first and second layers are shared by the first and second layers.

8. An apparatus to interleave memory banks of a memory element connected with a multi-layer bus system, comprising:
a plurality of slave interface units receiving signals from master and/or slave devices requesting access to a bus of one of a plurality of layers and generating corresponding control signals; and
a controller receiving the generated control signals from the plurality of slave interface units and generating signals required to access specific memory banks of the memory element, the specific memory banks accessed based on the generated corresponding signals,
wherein signals to access the memory banks corresponding to the plurality of master and/or slave devices connected with a second layer are received during a time delay between the signals to access the memory banks corresponding to the plurality of master and/or slave devices connected with a first layer and transmission of data to the plurality of master and/or slave devices connected with the first layer, and wherein a first memory bank of the memory element is specifically accessed by the master and/or slave devices connected with the first layer and a second memory bank of the memory element is specifically accessed by the master and/or slave devices connected with the second layer.

9. The apparatus according to claim 8, wherein the multi-layer bus system includes the plurality of layers and the plurality of layers of the multi-layer bus system are connected with a plurality of master and/or slave devices, and different banks are respectively allocated to the plurality of layers.

10. The apparatus according to claim 8, further comprising:
an arbiter receiving the signals from the master and/or slave devices requesting the bus access, and arbitrating the signals so that a right for the bus access is given to one of the plurality of master and/or slave devices.

11. The apparatus according to claim 8, wherein the controller processes a signal requesting access from the master and/or slave devices to a memory bank that has not yet been accessed by a plurality of master and/or slave devices for a first time and the signal is input from one of the plurality of slave interface units.

12. The apparatus according to claim 8, wherein a storage space of the memory element is divided into a plurality of banks, and the plurality of banks are allocated to the slave interface units.

13. The apparatus according to claim 8, wherein the memory element is a synchronous dynamic random access memory (SDRAM).

14. A computer storage medium storing a program that causes a computer to execute operations, comprising:
receiving signals requesting access from master and/or slave devices to a bus of one of a plurality of layers and generating respective control signals; and
receiving the control signals in a plurality of sets, and generating corresponding signals required to access specific memory banks of a memory element, the specific memory banks accessed based on the generated corresponding signals,
wherein signals to access the memory banks corresponding to the plurality of master and/or slave devices connected with a second layer are received during a time delay between the signals to access the memory banks corresponding to the plurality of master and/or slave devices connected with a first layer and transmission of data to the plurality of master and/or slave devices connected with the first layer, and wherein a first memory bank of the memory element is specifically accessed by the master and/or slave devices connected with the first layer and a second memory bank of the memory element is specifically accessed by the master and/or slave devices connected with the second layer.

15. A method of interleaving memory banks of a memory element connected with a bus system configured with first and second layers, comprising:
connecting the first and second layers of the bus system with a plurality of master and/or slave devices;
decoding commands to access the bus system that are input from the plurality of master and/or slave devices and respectively generating corresponding signals to access specific memory banks; and
controlling access to the specific memory banks of the memory element based on the generated corresponding signals and in accordance with corresponding connection of the plurality of master and/or slave devices to the first and second layers of the bus system,
wherein signals to access the memory banks corresponding to the plurality of master and/or slave devices connected with a second layer are received during a time delay between the signals to access the memory banks corresponding to the plurality of master and/or slave devices connected with a first layer and transmission of data to the plurality of master and/or slave devices connected with the first layer, and wherein a first memory bank of the memory element is specifically accessed by the master and/or slave devices connected with the first layer and a second memory bank of the memory element is specifically accessed by the master and/or slave devices connected with the second layer.

16. The method according to claim 15, wherein the bus system is an Advanced Microcontroller Bus Architecture Advanced High-performance Bus system.

17. The method according to claim 15, wherein the specific memory banks of the memory element are respectively allocated to the first and second layers of the bus system.

18. The method according to claim 15, wherein the memory element is a double data rate (DDR) memory element.

19. A method of interleaving memory banks of a memory element connected with a bus system configured with layers, comprising:
- connecting the layers of the bus system with corresponding plurality of master and/or slave devices; and
- controlling access to specific memory banks of the memory element in accordance with the corresponding connection of the plurality of master and/or slave devices to the layers of the bus system, where the memory banks are respectively allocated to the layers of the bus system,
- wherein the specific memory banks are accessed based on generated corresponding signals required to access the specific memory banks,
- wherein signals to access the memory banks corresponding to the plurality of master and/or slave devices connected with a second layer are received during a time delay between the signals to access the memory banks corresponding to the plurality of master and/or slave devices connected with a first layer and transmission of data to the plurality of master and/or slave devices connected with the first layer, and wherein a first memory bank of the memory element is specifically accessed by the master and/or slave devices connected with the first layer and a second memory bank of the memory element is specifically accessed by the master and/or slave devices connected with the second layer.

20. A method of interleaving memory banks of a memory element connected with a multi-layer bus system, comprising:
- receiving first signals from a master device connected with a first layer of the multi-layer bus system requesting access to a first memory bank of the memory element;
- receiving second signals from a master device connected with a second layer of the multi-layer bus system requesting access to a second memory bank of the memory element; and
- generating corresponding signals required to access the memory element in an order of a signal to enable selection of a row of an address corresponding to the first signals, a signal to enable selection of a column of the address corresponding to the first signals and a signal to enable selection of a row of an address corresponding to the second signals,
- wherein a transmission of data to the device connected with the first layer is executed after the signal to enable selection of the row of the address corresponding to the second signals is generated.

21. The method according to claim 20, wherein the signal to enable selection of the row of the address corresponding to the first signals or to the second signals is a Row Address Strobe (RAS) signal.

22. The method according to claim 20, further comprising generating a signal to enable selection of a column of the address corresponding to the second signals, wherein the signal to enable selection of the column of the address corresponding to the first signals or to the second signals is a Column Address Strobe (CAS) signal.

23. The method according to claim 20, wherein the memory element is a synchronous dynamic random access memory (SDRAM).

24. An apparatus to interleave memory banks of a memory element connected with a multi-layer bus system, comprising:
- a plurality of slave interface units receiving first signals from a master device connected with a first layer of the multi-layer bus system requesting access to a first memory bank of the memory element and receiving second signals from a master device connected with a second layer of the multi-layer bus system requesting access to a second memory bank of the memory element; and
- a controller generating corresponding signals required to access the memory element in an order of a signal to enable selection of a row of an address corresponding to the first signals, a signal to enable selection of a column of the address corresponding to the first signals and a signal to enable selection of a row of an address corresponding to the second signals,
- wherein a transmission of data to the device connected with the first layer is executed after the signal to enable selection of the row of the address corresponding to the second signals is generated.

25. The apparatus according to claim 24, wherein the signal to enable selection of the row of the address corresponding to the first signals or to the second signals is a Row Address Strobe (RAS) signal.

26. The method according to claim 24, wherein a signal to enable selection of a column of the address corresponding to the second signals is generated, and wherein the signal to enable selection of the column of the address corresponding to the first signals or to the second signals is a Column Address Strobe (CAS) signal.

27. The method according to claim 24, wherein the memory element is a synchronous dynamic random access memory (SDRAM).

* * * * *